Jan. 13, 1959 H. V. THADEN Re. 24,587
RECLINING CHAIR
Original Filed May 15, 1956
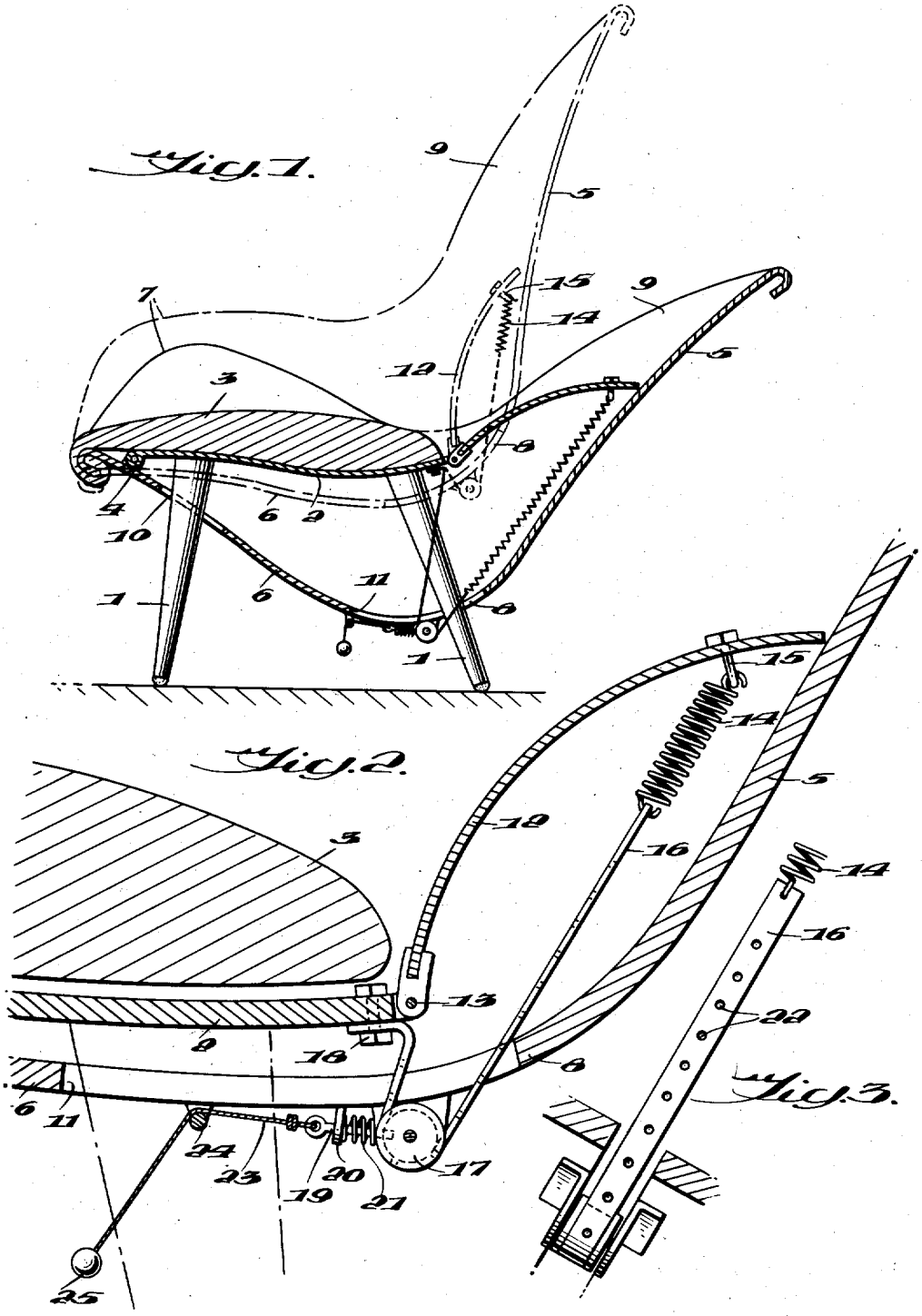

United States Patent Office

Re. 24,587

Reissued Jan. 13, 1959

24,587

RECLINING CHAIR

Herbert V. Thaden, High Point, N. C., assignor to Thaden Molding Corporation, High Point, N. C., a corporation of North Carolina Original No. 2,824,601, dated February 25, 1958, Serial No. 585,085, May 15, 1956. Application for reissue September 10, 1958, Serial No. 760,827

5 Claims. (Cl. 155—152)

Matter enclosed in heavy brackets [ ] appears in the original patent but forms no part of this reissue specification; matter printed in italics indicates the additions made by reissue.

This invention relates to a reclining chair of the type which is adapted to be positioned in either upright or reclining position and preferably also in several intermediate positions.

In one type of reclining chair heretofore extensively used the back of the chair is hinged at its lower edge to the rear edge of the seat so that as the back is moved from upright to reclining position the seat and arms remain in substantially horizontal position. In another well known type of reclining chair the entire chair body i. e. the seat, arms and back, all move together from the upright to the reclining position while retaining their relative position to each other.

An object of my invention is to provide a reclining chair in which the back and arm portions of the chair move together about a pivot line or hinge adjacent the front edge of the seat of the chair while the seat only remains stationary.

Another object of my invention is to provide a chair of the type described above in which the tilting of the back of the chair does not create a vacant space between the rear edge of the seat and the back.

Another object of my invention is to provide a reclining chair in which the height of the front edge of the seat remains fixed and does not rise as the back of the seat is moved to reclining position.

Another object of my invention is to provide a reclining chair in which the seat remains stationary and in which the arms tilt with the back when the latter is moved to reclining position.

Another object of my invention is to provide a reclining chair which has substantially the normal appearance of a non-reclining chair.

Finally an object of my invention is to provide a reclining chair in which it is easy for the occupant to lean forward and to stand from the reclining position of the chair.

An embodiment of my invention is illustrated in the accompanying drawings in which Fig. 1 is a sectional view showing the upright position of the back and arms of the chair in broken lines and the reclining position of these parts in full lines.

Fig. 2 is an enlarged section showing only a portion of the seat with the back in the reclining position as in Fig. 1, and Fig. 3 is a plan view of a part of the mechanism for locking the back of the chair in the chosen position.

Referring to the drawing, 1, 1 are the legs and 2 is the seat to which the legs are secured. The legs and seat do not move relative to each other and constitute a rigid four-legged stool. It is within the scope of my invention to replace this four-legged stool by a pedestal, swivel type base. The seat 2 is provided with a suitable cushion or padding 3, secured thereto in any suitable way. The arms and back of the chair constitute a unitary shell structure which is hinged to the front edge of the seat 2 at the hinge 4. As illustrated it is assumed that the seat 2 is formed of sheet metal or the like of more or less rigid material, and that its front edge is bent to form half of the hinge 4 while the other half of the hinge 4 is secured adjacent the front edge of the arm and back assembly. As is obvious, the described integral hinge may be substituted by a separate hinge element suitably secured to the front edge of the seat. The arm and back assembly consists of the normally substantially vertically extending back portion 5, the normally substantially horizontally extending bottom portion 6, the connecting curved portion 8 and the arms 7. The portions 5 and 6 preferably are integral as illustrated, although this is not essential, and they may be formed of metal, plywood, plastic or the like. Wings 9, which may be omitted, extend forwardly from the side edges of the back portion 5. A showing of the cushion or padding covering the back portion has been omitted.

The bottom portion 6 is provided with front openings 10 around the front legs 1 and with openings 11 which extend into the curved portion 8 for the rear legs 1. A pedestal type seat would require only a single opening in the bottom 6 for the pedestal.

It will be seen that in the structure thus far described the stool consisting of the legs 1 or pedestal, seat 2 and seat cushion 3 remain stationary while the entire structure consisting of the back portion 5, the curved portion 8, the bottom portion 6, the arms 7 and the wings 9, if present, is tiltable as a unit about the hinge 4 from the upright position shown in broken lines to the reclined position shown in full lines in Fig. 1.

It will be noted that as the stool remains stationary and the back is tilted to reclining position a space is created between the seat and the back which would be highly objectionable. In accordance with my invention this space is covered by the tiltable kidney plate 12 which is hinged at 13 to the rear edge of the seat 2. A showing of the cushion or padding which covers the plate 12 also has been omitted.

In order to cause the plate 12 to follow the tilting movement of the back, curved and bottom portions 5, 6 and 8, I have provided the following mechanism. The spring 14 is anchored at one end by the eye 15 adjacent the upper edge of the plate 12 and at the other end to the flexible strap 16 which extends downwardly through opening 11, around the pulley 17 and upward to the rear edge of the seat 2 where it is anchored by the bolt 18. Thus it will be seen that as the back 5 is tilted to reclining position the spring 14 is stretched so that the tendency of the spring 14 is to resist tilting and to return the back 5 to its upright position.

In order to hold the back 5 in any selected position I have provided a simple latch mechanism consisting of the pin 19 which is supported by and slidable in the eye 20, the spring 21 which tends to move the locking pin 19 to the right as seen in Figs. 1 and 2 to engage the openings 22 in the strap 16, and the cord 23 for moving the pin 19 to the left out of engagement with the strap 16. The cord 23 has a guide 24 on the bottom 6 and a ball or ring 25 for the use of the occupant of the chair.

The chair operates as follows. Assuming that the chair is in upright position the occupant of the chair pulls the cord 23 thereby releasing the pin 19 from the strap 16 and then pushes on the back 5 to tilt the back to the desired reclining position. The cord 23 is then released permitting the pin 19 to drop in one of the holes 22 in the strap and the chair is locked in the desired reclining position. If the occupant of the chair wishes to return to upright position he merely pulls the cord 23 and leans forward and the back 5 is moved to upright position by the force of the spring 14.

I claim:

1. A reclining chair comprising a seat frame, means for supporting said seat frame a fixed distance above a floor supporting surface, a rigid shell having a normally substantially vertically disposed back portion adapted to support the shoulders of an occupant and a bottom portion substantially at right angles to said back portion, means for pivotally connecting the forward edge of the bottom portion of said shell to said seat frame so that said shell may pivot rearwardly from an erect position to a reclined position with respect to said seat frame, a kidney plate adapted to support the small of the back of the occupant, said kidney plate being pivotally connected at its lower edge to the rear edge of said seat frame, and spring means intermediate said shell and said seat frame biasing said shell to its erect position with respect to said seat frame.

2. A reclining chair as defined in claim 1 wherein the front edge of the bottom portion of said shell is pivotally connected to the front edge of said seat frame.

3. A reclining chair as defined in claim 1 wherein said spring means comprises a spring attached at one end to said plate, a pulley secured to the bottom portion of said shell and a flexible strap connected at one end to the other end of said spring and extending around said pulley and fastened at its other end to said seat frame.

4. A reclining chair as defined in claim 3 wherein said strap has a plurality of longitudinally spaced apertures therein and including latch means for securing said shell in a desired reclined position comprising a locking pin slidably connected to said shell adjacent said pulley, said locking pin being adapted to engage any one of said apertures in said strap depending on the position of the shell with respect to the seat frame, spring means biasing said pin into engagement with said aperture, and means controlled by the occupant of said chair for retracting said locking pin against said spring biasing means from engagement with said aperture.

*5. A reclining chair comprising a seat frame, means supporting said seat frame a fixed distance above a floor supporting surface, a rigid shell having a normally substantially vertically disposed back portion adapted to support the shoulders of an occupant and at least one lower portion extending forwardly substantially at right angles to said back portion, means pivotally connecting the lower portion of said shell to said seat frame forwardly of the rear edge thereof so that said shell may pivot rearwardly from an erect position to a reclined position with respect to said seat frame, a kidney plate adapted to support the small of the back of the occupant, said kidney plate being pivotally connected at its lower edge to the rear edge of said seat frame, and spring means intermediate said shell and said seat frame biasing said shell to its erect position with respect to said seat frame.*

References Cited in the file of this patent or the original patent

UNITED STATES PATENTS

| | | |
|---|---|---|
| 1,107,778 | Gaugh | Aug. 18, 1914 |
| 1,701,604 | Boery | Feb. 12, 1929 |